United States Patent
Mahjoub

(10) Patent No.: US 7,520,465 B2
(45) Date of Patent: Apr. 21, 2009

(54) AIRCRAFT FLUID COOLING SYSTEM AND AIRCRAFT PROVIDED WITH SAID SYSTEM

(75) Inventor: Fares Mahjoub, Toulouse (FR)

(73) Assignee: Airbus, Blagnac (FR)

( * ) Notice: Subject to any disclaimer, the term of this patent is extended or adjusted under 35 U.S.C. 154(b) by 374 days.

(21) Appl. No.: 10/480,641

(22) PCT Filed: Nov. 21, 2003

(86) PCT No.: PCT/FR03/03450

§ 371 (c)(1),
(2), (4) Date: Feb. 6, 2006

(87) PCT Pub. No.: WO2005/061323

PCT Pub. Date: Jul. 7, 2005

(65) Prior Publication Data

US 2006/0196633 A1    Sep. 7, 2006

(51) Int. Cl.
*B64D 33/10* (2006.01)
(52) U.S. Cl. .................. 244/57; 244/134 B; 165/44
(58) Field of Classification Search ............ 244/57, 244/134 B, 211, 212, 213, 214, 215, 216, 244/217, 45 R, 130; 165/44, 271, 200, 287, 165/41
See application file for complete search history.

(56) References Cited

U.S. PATENT DOCUMENTS

| | | | | | |
|---|---|---|---|---|---|
| 1,412,073 | A | * | 4/1922 | Wagenseil | .................. 244/57 |
| 2,168,166 | A | * | 8/1939 | Larrecq | .................. 244/57 |
| 2,216,111 | A | * | 10/1940 | Huet | .................. 180/68.4 |
| 2,352,144 | A | * | 6/1944 | Woods | .................. 244/204 |
| 3,421,577 | A | * | 1/1969 | Valyi | .................. 165/170 |
| 4,962,903 | A | * | 10/1990 | Byron | .................. 244/117 A |
| 5,123,242 | A | * | 6/1992 | Miller | .................. 60/226.1 |
| 6,129,056 | A | * | 10/2000 | Skeel et al. | .................. 123/41.49 |
| 6,269,872 | B1 | * | 8/2001 | Anderson | .................. 165/271 |
| 6,435,144 | B1 | * | 8/2002 | Dicke et al. | .................. 123/41.12 |
| 2001/0050167 | A1 | * | 12/2001 | Buysse et al. | .................. 165/279 |

FOREIGN PATENT DOCUMENTS

| | | |
|---|---|---|
| DE | 738 758 | 8/1943 |
| EP | 0 469 825 | 2/1992 |
| FR | 2831938 A1 * | 5/2003 |

* cited by examiner

*Primary Examiner*—Michael R Mansen
*Assistant Examiner*—Richard R Green
(74) *Attorney, Agent, or Firm*—Oblon, Spivak, McClelland, Maier & Neustadt, P.C.

(57) ABSTRACT

An aircraft fluid cooling system has an air heat exchanger passed by this fluid, the air heat exchanger including a structure for introduction of air and an air exhaust. The air heat exchanger is installed in a housing located in a flap guide rail fairing connected to one wing of the aircraft. The structure for introduction of air in the air heat exchanger is connected to an air inlet crossing an outer surface of the flap guide rail fairing and an air exhaust of the air heat exchanger is connected to an air output opening outside the outer surface such that air outside the aircraft passes this air heat exchanger to cool the fluid.

27 Claims, 5 Drawing Sheets

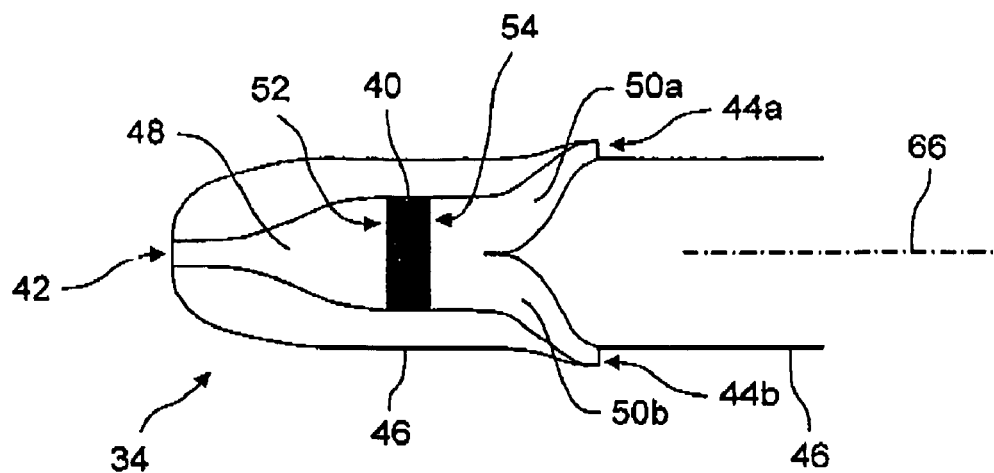
Fig. 7
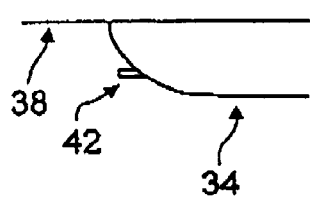   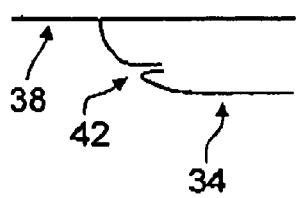   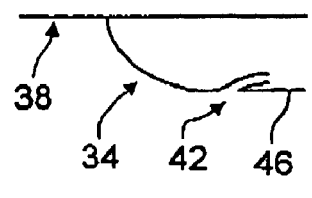
Fig. 8a   Fig. 8b   Fig. 8c
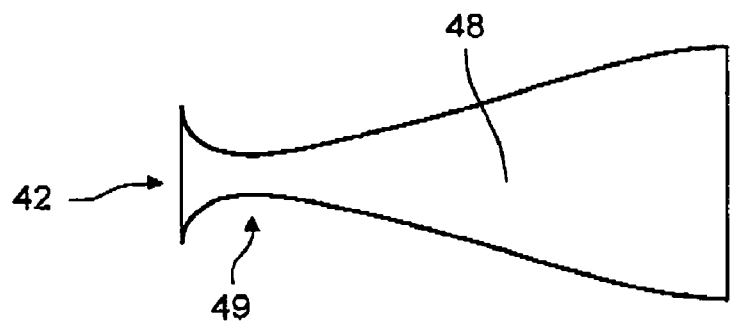
Fig. 9

AIRCRAFT FLUID COOLING SYSTEM AND AIRCRAFT PROVIDED WITH SAID SYSTEM

TECHNICAL DOMAIN

The invention concerns a system for cooling an aircraft fluid, in particular, a hydraulic fluid circulating on board this aircraft, said hydraulic fluid being for supplying one or more hydraulic actuators. The invention also concerns an aircraft equipped with such a system for cooling a fluid, in particular, a hydraulic fluid circulating on board this aircraft.

PRIOR ART

In an aircraft, there are generally one or more hydraulic fluid circuits, for supplying one or more hydraulic actuators such as, for example, hydraulic motors, or servo-controls, or pistons, etc. In the description which follows, such a hydraulic actuator which is supplied with hydraulic fluid, or which "consumes" the energy from the hydraulic fluid, shall be called the "consumer mechanism" or simply, "consumer".

FIG. 1 shows a conventional hydraulic fluid circuit, identified by the reference number 2. It includes, as is known per se, a hydraulic fluid reservoir 10, one or more hydraulic pumps 12, and piping 14, 16, 18 and 20.

The operating principle for such a circuit will be briefly summarised, in a particular case where the circuit is supplying a single consumer 22, it being understood that a circuit supplying several consumers 22 operates according to a similar principle. The hydraulic pump 12 is a high pressure pump which pumps or draws in hydraulic fluid from the reservoir 10 through a first pipe called the fluid suction pipe 14. The hydraulic fluid is then sent, under high pressure, to a consumer 22 by means of a second pipe, called the fluid supply pipe 16. The consumption of energy by said consumer 22 is shown by a reduction in hydraulic fluid pressure, which is at low pressure as it leaves the consumer, in a third pipe called the fluid return pipe 18, through which it is sent back to the hydraulic fluid reservoir 10.

The hydraulic fluid circuit generally includes an additional pipe, called the drainage pipe 20, connected to the hydraulic pump. This allows for sending part of the hydraulic fluid coming from the hydraulic pump 12 and corresponding to internal leaks in this pump 12, directly back to the reservoir 10. Generally, it is estimated that approximately 10% to 15% of the total power available to the pumps is lost as a result of the existence of these internal leaks, and that this power fraction is turned into heat. This results in the heating of the hydraulic fluid that passes through the drainage pipe 20 towards the hydraulic fluid reservoir 10.

The hydraulic fluid consumers may also heat said hydraulic fluid, generally to a lesser degree than the pumps.

Such heating of the hydraulic fluid has a harmful effect on the functioning of the hydraulic circuit. In fact, this heating results in the degradation of the hydraulic fluid, and thus in a reduction in its performance. In particular, heating of the fluid may lead to an increase in the acidity of said fluid, which can cause deterioration of the consumer mechanisms of said hydraulic fluid. This heating may also lead to a deterioration of the joints in the hydraulic circuit, and consequently, external leaks on the hydraulic circuit.

It is therefore necessary to keep the hydraulic fluid, circulating through ouch a hydraulic circuit for supplying one or more consumers, below a certain temperature, called the stability temperature, of said hydraulic fluid.

A first solution consists in using the natural capacity of the hydraulic circuit to dissipate the heat by natural convection or by forced convection using the ambient air around the pipes. This first solution is satisfactory for aircraft whose hydraulic power requirements are sufficiently low so that such heat dissipation through the fluid supply pipes provides total or near-total dissipation of the hydraulic fluid heating. Dissipation is all the more efficient because the supply pipes are long. But for aircraft that are compact with regard to the hydraulic power installed, i.e. which have short supply pipes in comparison to the hydraulic power available, the natural dissipation of heat is still insufficient.

A second solution for improving the cooling of the hydraulic fluid consists in adding a heat exchanger placed inside a fuel tank on the aircraft to the hydraulic circuit. The hydraulic fluid passes this heat exchanger, it is then cooled, and its heat is transferred to the fuel contained in the fuel tank housing the heat exchanger. This second solution was able to be used on old aircraft, but it has no longer been acceptable since new safety regulations came into effect, which stipulate minimising any heat transfers to fuel. A first condition required by the regulations recommends limiting the generation of fuel vapour within each fuel tank. This is achieved if the temperature of the fuel stays below its flammable temperature $T_F$. A second condition required by the regulations stipulates that the temperature $T_M$ of the fuel as it enters the engines must not exceed a maximum value. Consequently, this second solution may no longer be used, as it does not allow for controlling the temperature of the fuel, whether inside the fuel tanks or as it enters the engines, and consequently, neither of the statutory conditions are respected.

SUMMARY OF THE INVENTION

The precise subject of the invention is an aircraft fluid cooling system which resolves the problems posed by systems of the prior art. In accordance with the invention, this system comprises an air heat exchanger, passed through by, the fluid to be cooled, said air heat exchanger including a means for air intake and an air exhaust means, characterised in that this air heat exchanger is installed in a housing located in a flap guide rail fairing connected to one of this aircraft's wings, said means for the introduction of air into the air heat exchanger being connected to an air inlet means passing the outer surface of the fairing and said air exhaust means for this air heat exchanger being connected to an air exhaust means opening outside said outer surface in such a way that the air outside the aircraft passes through this air exchanger to cool said fluid.

This aircraft fluid cooling device allows for discharging the heat from the cooling of said fluid into the air outside this aircraft. In so doing, it benefits from the dynamic flow of air around the aircraft.

In a preferred embodiment, said air inlet means passing the outer surface of the fairing corresponds to a ram air intake. The term "ram air intake" describes an air intake allowing at least some of the dynamic pressure resulting from the movement of the aircraft through the air to be captured.

Advantageously, the aircraft fluid cooling system that is the subject of this invention has at least one fan for ensuring a minimum throughput of air in the air heat exchanger. This fan allows for ensuring and improving the cooling of said fluid by increasing the throughput of air through the air heat exchanger, in particular when the aircraft speed is nil (aircraft on the ground) or less than a predetermined value (e.g. during the take-off and landing phases). This fan can advantageously be installed upstream, depending on the direction of the air circulation, of the air heat exchanger or downstream of this air heat exchanger.

The invention also concerns an aircraft equipped with such an aircraft fluid cooling system.

BRIEF DESCRIPTION OF THE DRAWINGS

Other features and advantages of the invention will become apparent upon reading the description which will follow of specific embodiments of the invention, with reference to the accompanying drawings, in which:

FIG. 7 is a cross-section, on an approximately horizontal plane when the aircraft is parked on the ground, of a guide rail fairing and a cooling system according to the invention which represents a specific embodiment of the air output means;

FIGS. 8a, 8b, and 8c are cross-sections of ram air intakes;

FIG. 9 is a cross-section of a divergent duct with a neck;

DETAILED DESCRIPTION OF PREFERRED EMBODIMENTS

Figure 1:
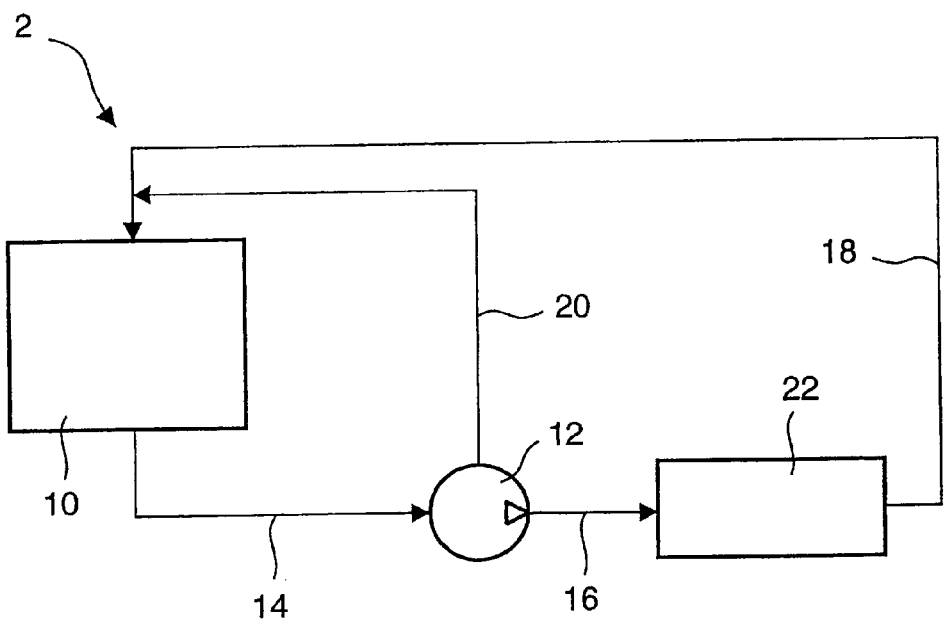
FIG. 1, already described, illustrates a hydraulic circuit for supplying consumers, as well as its operating principle.
Figure 2:
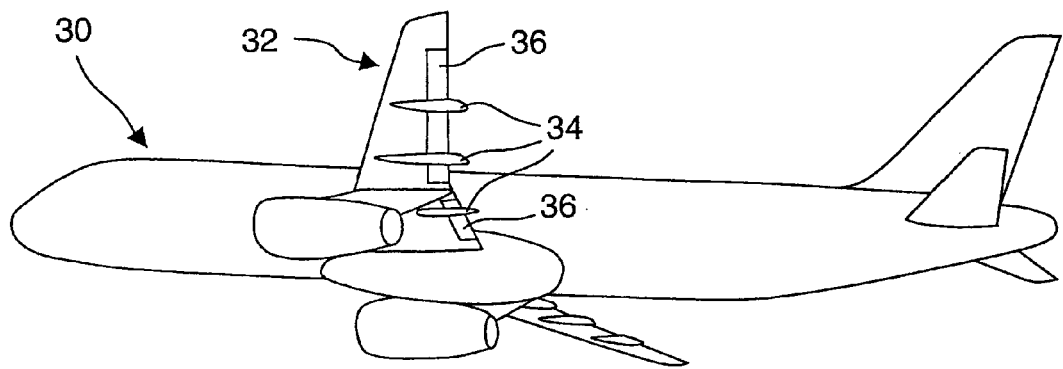
FIG. 2 illustrates, from the outside, an aircraft likely to be fitted with a fluid cooling system in accordance with the invention.
Figure 3:
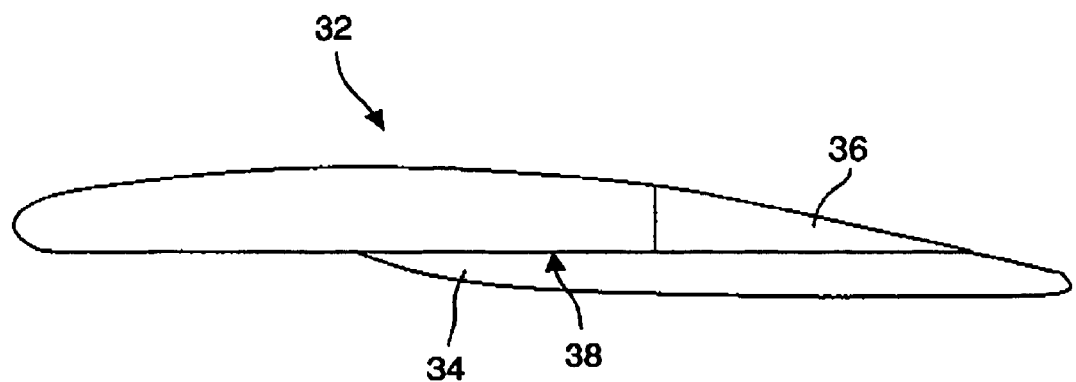
FIG. 3 is a cross-section of one wing of the aircraft of FIG. 2.
Figure 4:
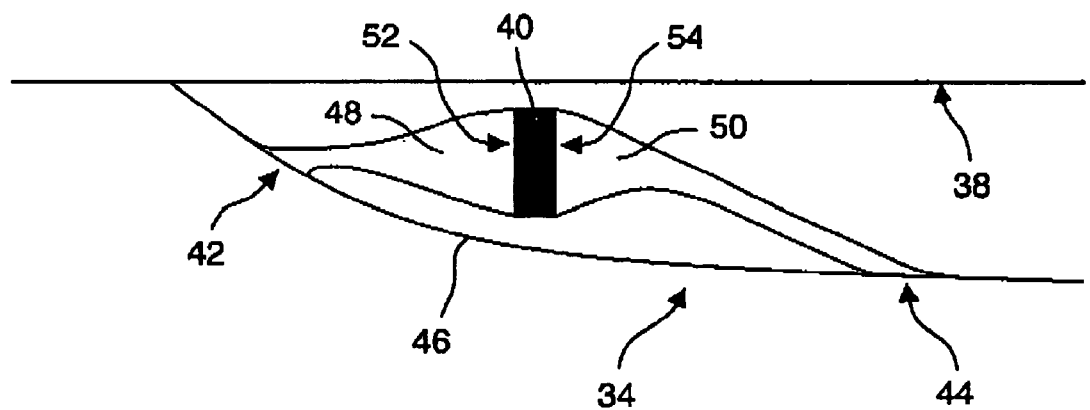
FIG. 4 is a cross-section of an aircraft's wing which illustrates, on a larger scale, a flap guide rail fairing in which an air heat exchanger is installed in accordance with the invention.

The aircraft fluid cooling system 30 in accordance with the invention, for which one embodiment is represented in FIG. 4, has an air heat exchanger 40 passed by said fluid to be cooled. This air heat exchanger 40 is installed in a housing located in a fairing 34 of the flap 36 guide rail connected to a wing 32 of this aircraft. Flap 36 guide rail fairings 34 connected to a wing 32 of an aircraft are represented from an exterior view in FIG. 2 and as a cross-section in FIG. 3. As is known, actuators, which are not shown, allow for moving these flaps 36 relative to the wing 32 of the aircraft 30 in such a way as to change the aerodynamic configuration of said aircraft. Said flap guide rails are generally located under the inner side 38 of the wing 32 and they are set to guide the movement of said flaps relative to this wing under the effect of said actuators. A fairing 34 is connected to each of said guide rails in such a way that these guide rails cause the minimum disruption possible to the aerodynamic characteristics of the wing 32 of the aircraft. In accordance with this embodiment of the invention, said housing in which the air heat exchanger 40 is installed is located in a free position within a flap guide rail fairing 34. A means for the introduction of air 52 into the air heat exchanger 40 is connected to an air inlet means 42 passing an external surface 46 of the fairing 34 in the forward part of the latter. Similarly, an air exhaust means 54 for the air heat exchanger 40 is connected to an air output means 44 which opens outside the outer surface 46 of the fairing 34, in a part of this fairing located behind said air inlet means 42 depending on the direction of advance of the aircraft in flight.

The air inlet means 42 is a ram air intake. This may, for example, be a Pitot tube, as represented in FIG. 8a, which has the advantage of recovering the maximum dynamic pressure of the air entering through said air intake. Alternatively, depending on the characteristics required as to the throughput of air in the heat exchanger 40 and the options of integration in the fairing 34, this ram air intake may also be of a type that recovers less dynamic pressure than a Pitot-type air intake, e.g. of a scoop type as represented in FIG. 8b, or even of a type embedded in the outer surface 46 of the fairing 34 (e.g. NACA) as shown in FIG. 8c.

Advantageously, the air inlet means 42 is connected to the means for the introduction of air 52 in the air heat exchanger 40 by a divergent duct 48, i.e., in which the section increases according to the direction of circulation of the air in said air inlet means 42 towards said means for the introduction of air 52 of the air heat exchanger 40. Conversely, the air exhaust means 54 of the air heat exchanger 40 is advantageously connected to the air output means 44 by a convergent duct 50, i.e. in which the section decreases according to the direction of circulation of the air in said air exhaust means, 54 of the air heat exchanger 40 towards said air output means 44. The divergent/convergent geometry of the air ducts 48, 50 on both sides of the heat exchanger 40 allow for reducing the speed of the air passing this heat exchanger in relation to the speed of the air entering the duct 48, and thus for reducing the losses in load when the air passes through this heat exchanger, which allows for recovering on leaving the convergent duct 50 an air speed close to that of the external air flow and consequently for reducing the interfering drag of the air output when the air passes through the heat exchanger 40, and more particularly an exchange matrix (not shown) in this heat exchanger, a transfer of heat is made from said fluid to be cooled to the air in question, the temperature of this latter (generally below 0° C. when the aircraft is flying under cruising conditions) being below the temperature of the fluid to be cooled (generally between 50 and 110° C., in the case of hydraulic fluid, when the aircraft is flying under cruising conditions). The heat transferred to the air when passing the heat exchanger 40 allows for supplying energy to the airflow, which contributes to reducing the device's drag. In the ideal scenario where the effect of this provision of energy is greater than the effect of the losses of load due to the airflow in ducts 48, 50 and in the heat exchanger 40, the device according to the invention even allows for contributing to increasing the aircraft's thrust.

In an advantageous manner, the air inlet means 42 is located in the forward part, according to the aircraft's flight direction, of the flap 36 guide rail fairing 34. The fairing 34 forms a protrusion below the wing 32 of the aircraft, the distribution of air pressure on the surface of the fairing 34 is such that the air pressure is at its maximum on the forward part of the latter. This allows for benefiting from a higher air pressure at the air inlet means 42 than at the air output means 44 (located behind said air inlet mechanism 42), which contributes to the proper functioning of the cooling system.

Advantageously, the air output means 44 comprises at least one nozzle positioned in the thrust axis of the aircraft 30. This allows, on the one hand, disruption to the aircraft's aerodynamics to be minimised and, on the other hand, best advantage to be taken of any contribution to this aircraft's thrust from said transfer of heat to the air passing through the heat exchanger 40. In an advantageous manner, this nozzle 44 is located on a lateral part of the flap guide rail fairing 34. In a preferred embodiment shown in FIG. 7, the convergent duct 50 has at least two parts 50a and 50b connected, respectively, to at least two nozzles 44a and 44b located on lateral parts of the flap guide rail fairing 34, these nozzles 44a and 44b being respectively located on each side of the longitudinal axis 66 (partially shown in FIG. 7) of said flap 36 guide rail fairing 34.

The dimensions of the air inlet means 42, the air output means 44, the ducts 48, 50 and the heat exchanger 40 are determined, ordinarily, according to losses of load, desired air mass throughput and the dynamic speed of the flow in such a way that in the flight phases considered, the throughput of cool air passing through the heat exchanger 40 allows for ensuring the thermal exchange capacity required for the cooling of the fluid. In a preferred embodiment, said flight phases considered correspond to the aircraft cruising flight.

In a preferred embodiment, the divergent duct 48 has a neck 49 as shown in FIG. 9. This neck 49 is located between the air inlet means 42 and the divergent part of the duct 48. It corresponds to a part of said duct 48 in which the section through which the air passes is minimal. This neck 49 allows for setting the air mass throughput in the divergent duct 48 by sound barrier: as is known, the speed of the air through the neck 49 is at most equal to the speed of sound. The result of this is that when the aircraft flies in the cruising phase, said airspeed in the neck 49 is equal to the speed of sound. The dimensioning of this neck 49 is calculated, ordinarily, to limit the throughput of air in the divergent duct 48 to a value which allows for respecting a maximum airspeed in the heat exchanger 40, determined according to losses of load which it is desired not to exceed. Another limitation on the air throughput may be determined in such a way as to limit the aerodynamic drag caused by said aircraft fluid cooling system to below a maximum predefined value.

Figure 5:
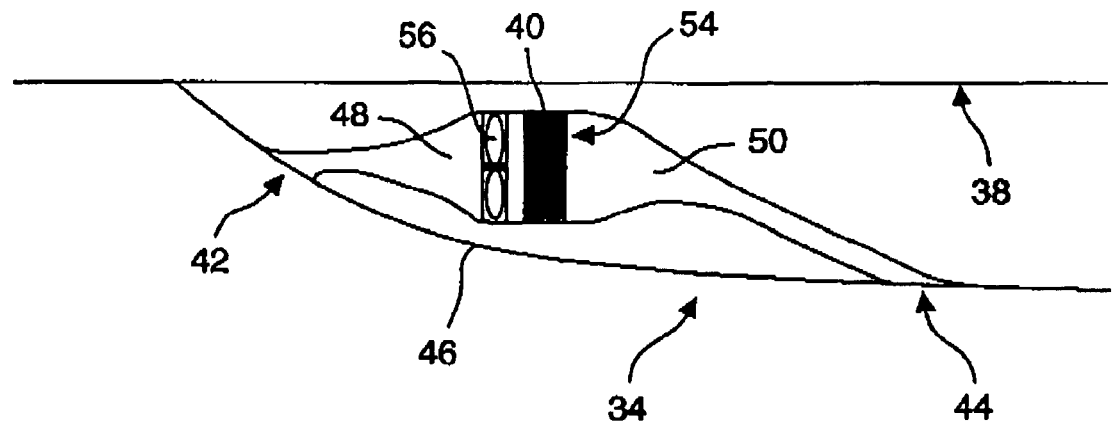
FIG. 5 is a similar view to that of FIG. 4, which illustrates a specific embodiment of the invention in which the cooling system has at least one fan.
Figure 6:
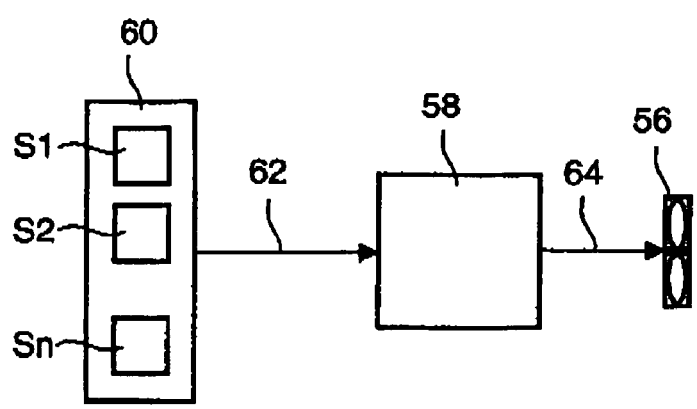
FIG. 6 is a schematic representation of a control system for the fan represented in FIG. 5.
Figure 10:
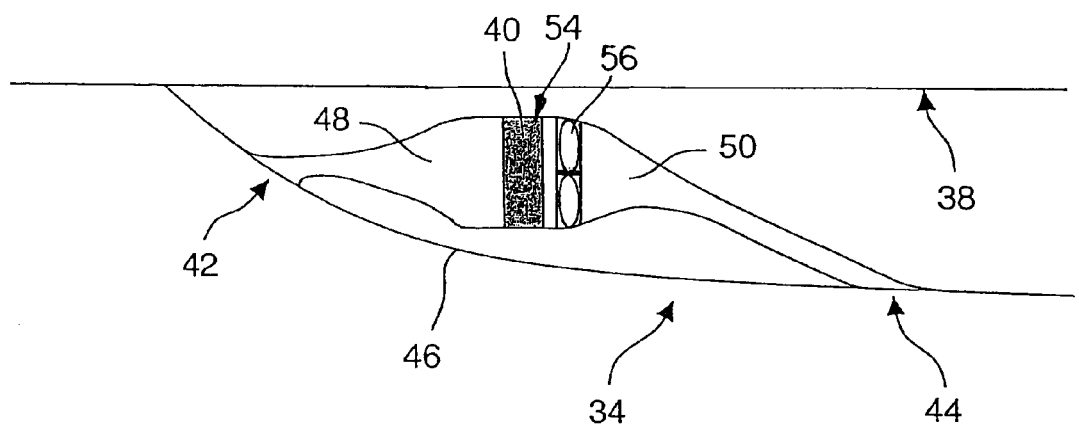
FIG. 10 is a view similar to FIG. 5, except the fan is behind the heat exchanger.
Figure 11:
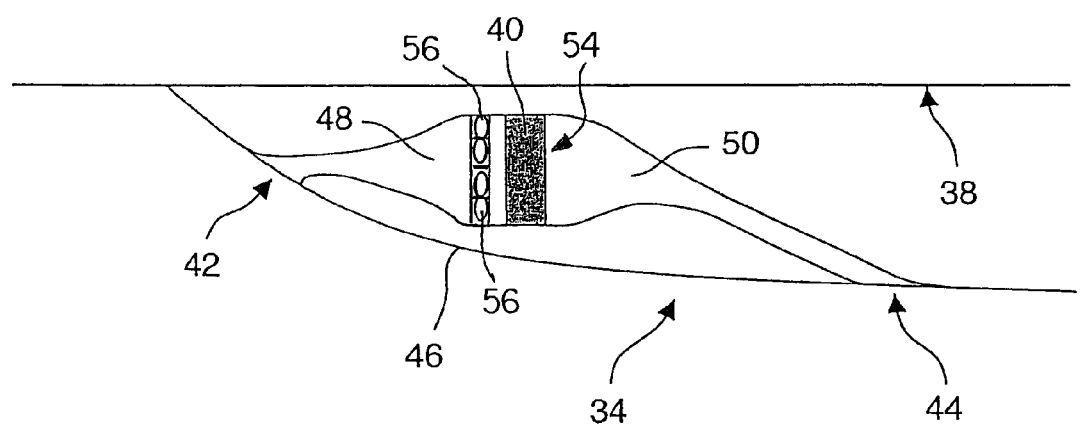
FIG. 11 is a view similar to FIG. 5 except the fan is replaced with two fans in parallel.

In a specific embodiment shown in FIG. 5, the cooling system subject of the invention has at least one fan 56. The operation of this fan 56 allows for ensuring and increasing the throughput of air in the heat exchanger 40, in particular when the aircraft's speed is nil (aircraft on the ground) or less than a predetermined value (e.g. in the take-off and landing phases). In this way, when the cooling system which is the subject of the invention is dimensioned to ensure the cooling of said fluid in the aircraft's cruising flight phases, the use of this fan allows for ensuring the cooling of said fluid in all the phases of use of the aircraft. Said cooling system comprising one fan 56 has the advantage of having a mass less than that of a cooling system which would be dimensioned to provide the cooling of this fluid without a fan in the aircraft's flight phases corresponding to a speed less than the cruising speed of this aircraft. It also has the advantage, in comparison to a system without a fan, of allowing for the cooling of said fluid even when the aircraft is running on the ground at nil speed. The fan 56 may be placed upstream, depending on the direction of the air circulation, of the heat exchanger 40 (FIG. 5), or downstream of this heat exchanger 40. It may be, in particular, electrically or hydraulically operated. In an advantageous manner, as shown in FIG. 6, this fan 56 is linked, by a connection 64, to control means 58 which have at least one input linked to a set 60 of sources of information S1, S2, . . . , Sn by at least one connection 62. These sources of information may in particular be from the aircraft's sensors or computers. Advantageously, the information provided by the sources of information S1, S2, . . . , Sn may in particular correspond to the temperature of the fluid to be cooled and/or the airspeed of the aircraft. In this case, the control means 58 stop the operation of the fan 56 when the temperature of the fluid is below a predetermined value Tmin so as not to cool this fluid excessively, or when the aircraft's airspeed is greater than a predetermined value Vmin so as not to race said fan. When the temperature of the fluid is greater than said predetermined value Tmin and/or when the aircraft's airspeed is less than said predetermined value Vmin, the control means 58 activate the fan 56 operation to force the circulation of the air in the heat exchanger 40. Such a mode of functioning offers the advantage of allowing for sufficient cooling of the fluid in flight phases other than those (corresponding for example to cruise flight phases) for which the dimensioning of the cooling system has been dimensioned. For example, a Vmin value may be chosen that is greater than the take-off speed and less than the cruising speed. As a variant of this embodiment, the control means 58 control the fan 56 with a variable decreasing speed when the aircraft's airspeed increases, so that the fan 56 is not controlled (nil speed) when the aircraft's airspeed is greater than Vmin. In another variant of this embodiment, the control means 58 control the fan 56 according to the temperature of the fluid to be cooled, either according to an on-off adjustment, or with a variable decreasing speed when the fluid temperature decreases. Both these embodiment variants may also be combined with each other.

As an alternative, it is possible to have several fans 56 in parallel so as to increase the availability of the heat exchanger in the event of the breaking down of one of the fans 56. In the above-mentioned cage where the convergent duct 50 has two parts 50a and 50b connected, respectively to the two nozzles 44a and 44b, it is possible to have a fan 56 at the inlet of each of said parts 50a and 50b of said duct 50, the term inlet here being used in relation to the airflow direction when the aircraft 30 is in flight.

The invention also concerns an aircraft 30 with at least one fluid cooling system as described previously. For example, the aircraft 30 may have at least one such cooling system in several flap 36 guide rail fairings 34 on this aircraft 30, so as to maximise the fluid cooling power of the aircraft 30 and/or to cover the fluid cooling requirements corresponding to the separate circuits of the aircraft 30.

In one specific embodiment, the aircraft 30 has at least one hydraulic fluid circuit in which the hydraulic fluid is cooled by said cooling system or systems. Preferably, said hydraulic fluid passing through the air heat exchanger 40 is from the drainage pipe 20 of at least one hydraulic pump 12. This embodiment offers the advantage of only sending the part of the hydraulic fluid to the heat exchanger 40 that has been subjected to the most significant temperature rise, which provides greater efficiency of the cooling system.

The invention claimed is:

1. An aircraft fluid cooling system for an aircraft having a wing, comprising:
    an air heat exchanger passed through by a fluid, said air heat exchanger including means for introducing air and an air exhaust,
    wherein said air heat exchanger is installed in a housing located in a flap guide rail fairing, said flap guide rail being located under the wing and said fairing forming a protrusion below the wing of the aircraft, said means for introducing air in the air heat exchanger being connected to an air inlet crossing an outer surface of the guide rail fairing and an air exhaust of this air heat exchanger being connected to an air output opening outside an outer surface in order that the air outside the aircraft passes through said air heat exchanger to cool said fluid.

2. The system according to claim 1, wherein said air inlet is connected to the means for introducing air of the air heat exchanger by a divergent duct whose section increases according to a direction of circulation of the air in said air inlet towards said means for introducing air of the air heat exchanger.

3. The system according to claim 2, wherein said divergent duct has a neck to limit throughput of air in said divergent duct in cruise flight phases.

4. The system according to claim 1, wherein said air exhaust of the air heat exchanger is connected to said air output opening by a convergent duct whose section decreases according to a direction of circulation of the air in said air exhaust of the air heat exchanger towards said air output opening.

5. The system according to claim 1, wherein said air inlet includes a ram air intake.

6. The system according to claim 5, wherein said air inlet includes a Pitot tube air intake.

7. The system according to claim 5, wherein said air inlet includes a scoop air intake.

8. The system according to claim 5, wherein said air inlet includes an air intake embedded in the outer surface of the flap guide rail fairing.

9. The system according to claim 1, wherein said air inlet is located in a forward part of the flap guide rail fairing.

10. The system according to claim 1, wherein said air output opening is made up of at least one nozzle positioned in a thrust axis of the aircraft.

11. The system according to claim 10, wherein said nozzle is located on a lateral part of the flap guide rail fairing.

12. The system according to claim 10, further comprising at least two nozzles located on lateral parts of the flap guide rail fairing.

13. The system according to claim 1, wherein dimensioning is provided to ensure the cooling of said fluid when the aircraft is flying under cruise conditions.

14. The system according to claim 1, further comprising at least one fan to ensure a minimal throughput of air in the air heat exchanger.

15. The system according to claim 14, further comprising control means for controlling said fan and which activates said fan when airspeed of the aircraft is below a predetermined value.

16. The system according to claim 14, further comprising control means for controlling said fan and which activates said fan when a temperature of the fluid to be cooled is greater than a predetermined value.

17. The system according to claim 14, further comprising control means for controlling said fan and which controls said fan with a variable speed that decreases when an airspeed of the aircraft increases.

18. The system according to claim 14, further comprising control means for controlling said fan and which controls said fan with a variable speed that decreases when a temperature of the fluid to be cooled decreases.

19. The system according to claim 14, further comprising plural fans arranged in parallel.

20. The system according to claim 1, further comprising a fan installed upstream of the air heat exchanger.

21. The system according to claim 1, further comprising a fan installed downstream of the air heat exchanger.

22. An aircraft including at least one fluid cooling system according to claim 1.

23. An aircraft according to claim 22, including at least one hydraulic fluid circuit in which hydraulic fluid is cooled by said at least one fluid cooling system.

24. An aircraft according to claim 23, wherein said hydraulic fluid passing through the air heat exchanger is from a drainage pipe of at least one hydraulic pump.

25. The aircraft according to claim 22, wherein the heat exchanger is disposed at a lower level than the flap during normal flight of the aircraft.

26. The aircraft according to claim 22, wherein the flap forms a continuation of an upper profile of the wing during normal flight of the aircraft.

27. An aircraft including at least one fluid cooling system according to claim 1, with plural flap guide rail fairings connected to wings of the aircraft.

* * * * *